US010015081B1

(12) United States Patent
Heitz (10) Patent No.: US 10,015,081 B1
(45) Date of Patent: Jul. 3, 2018

(54) POISON-PATH ROUTING POLICY (71) Applicant: Cisco Technology, Inc., San Jose, CA (US)

(72) Inventor: Jakob Heitz, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 71 days.

(21) Appl. No.: 15/279,480

(22) Filed: Sep. 29, 2016

(51) Int. Cl.
*H04L 12/28* (2006.01)
*H04L 12/707* (2013.01)
*H04L 12/741* (2013.01)

(52) U.S. Cl.
CPC .......... *H04L 45/22* (2013.01); *H04L 45/745* (2013.01)

(58) Field of Classification Search
CPC .......... H04L 29/06095; H04L 29/0653; H04L 45/74; H04L 49/3009; H04L 49/309; H04L 45/22; H04L 45/745
USPC ........................................................ 370/392
See application file for complete search history.

(56) References Cited

U.S. PATENT DOCUMENTS

| | | | |
|---|---|---|---|
| 8,141,156 B1 | 3/2012 | Mao et al. | |
| 8,521,904 B1* | 8/2013 | Pei | H04L 45/02 370/255 |
| 8,769,662 B2* | 7/2014 | Ji | H04L 63/1466 370/248 |
| 2010/0132037 A1* | 5/2010 | Ji | H04L 63/1416 726/22 |
| 2010/0132039 A1* | 5/2010 | Ji | H04L 63/1408 726/23 |
| 2010/0153537 A1 | 6/2010 | Wang et al. | |
| 2011/0138466 A1* | 6/2011 | Ji | H04L 63/1466 726/23 |
| 2012/0198541 A1* | 8/2012 | Reeves | H04L 63/0227 726/13 |
| 2014/0281505 A1* | 9/2014 | Zhang | H04L 9/3268 713/158 |
| 2016/0330236 A1* | 11/2016 | Reddy | H04L 63/1466 |
| 2017/0180418 A1* | 6/2017 | Shen | H04L 63/1466 |

OTHER PUBLICATIONS

Katz-Bassett, Ethan B.; Systems for Improving Internet Availability and Performance; 2012.
Rehkter, Y et al.; A Border Gateway Protocol 4(BGP-4), RFC 4271; 2006.

* cited by examiner

Primary Examiner — Robert Lopata (57) ABSTRACT

In one embodiment a system, method, and related apparatus are described for a router which receives notice of a route including a hijacked prefix having a hijacked prefix netmask length, searches a set of routes with equal or shorter netmask lengths that cover the hijacked prefix in order to find at least one route which has no autonomous system (AS) in common with the particular route comprising the hijacked prefix, if a specific route is found with a netmask length equal to or shorter than the hijacked prefix netmask length, then the specific route which has been found is a determined alternative route, extracts the particular route comprising the hijacked prefix from the specific route if said specific route has a netmask length covering a larger address range than the hijacked prefix netmask length, inserts the determined alternative route in a routing table, and modifies attributes of the determined alternative route in the routing table according to the determined alternative route. Related systems, methods, and apparatus are also described.

20 Claims, 6 Drawing Sheets

POISON-PATH ROUTING POLICY

TECHNICAL FIELD

The present disclosure generally relates to communication networks.

BACKGROUND

An autonomous system (AS) is a set of routers under a single technical administration, using an interior gateway protocol (IGP) and common metrics to determine how to route packets within the AS, and using an inter-AS routing protocol to determine how to route packets to other ASes. It has become common for a single AS to use several IGPs and sometimes several sets of metrics within the AS. The use of the term "Autonomous System" stresses the fact that, even when multiple IGPs and metrics are used, the administration of a first AS appears to other ASes to have a single coherent interior routing plan and presents a consistent picture of what destinations are reachable through the first AS.

The Border Gateway Protocol (BGP) is a standardized exterior gateway protocol designed to exchange routing and reachability information among ASes on the Internet. The protocol is often classified as a path vector protocol but is sometimes also classed as a distance-vector routing protocol.

BRIEF DESCRIPTION OF THE DRAWINGS

The present disclosure will be understood and appreciated more fully from the following detailed description, taken in conjunction with the drawings in which:

FIG. 2B is a simplified pictorial illustration of the exemplary communication network of FIG. 1, depicting a hijacked routing path between a hijacking AS, and the second AS;

DESCRIPTION OF EXAMPLE EMBODIMENTS

Overview

In one embodiment a system, method, and related apparatus are described for a router which receives notice of a route including a hijacked prefix having a hijacked prefix netmask length, searches a set of routes with equal or shorter netmask lengths that cover the hijacked prefix in order to find at least one route which has no autonomous system (AS) in common with the particular route comprising the hijacked prefix, if a specific route is found with a netmask length equal to or shorter than the hijacked prefix netmask length, then the specific route which has been found is a determined alternative route, extracts the particular route comprising the hijacked prefix from the specific route if said specific route has a netmask length covering a larger address range than the hijacked prefix netmask length, inserts the determined alternative route in a routing table, and modifies attributes of the determined alternative route in the routing table according to the determined alternative route. Related systems, methods, and apparatus are also described.

Example Embodiments

Figure 1:
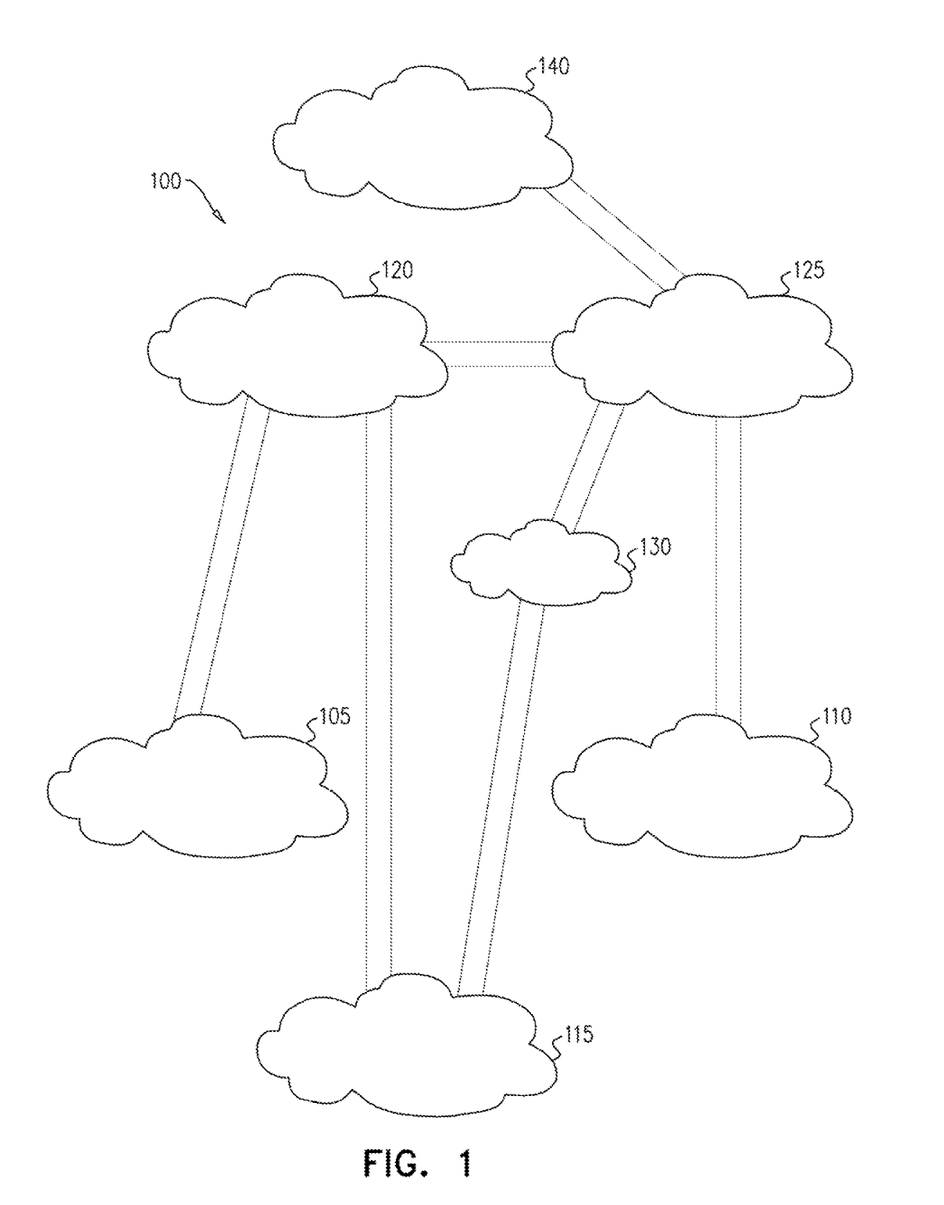
FIG. 1 is a simplified pictorial illustration of an exemplary communication network comprising a plurality of autonomous systems constructed and operative in accordance with an embodiment of the present invention.

Reference is now made to FIG. 1, which is a simplified pictorial illustration of an exemplary communication network 100 comprising a plurality of autonomous systems (AS, referred to herein in the plural as "ASes") 105, 110, 115, 120, 125, 130, 140 constructed and operative in accordance with an embodiment of the present invention. Each of the plurality of ASes 105, 110, 115, 120, 125, 130, 140 comprises at least one router (not shown) on which Border Gateway Protocol (BGP) is implemented. It is appreciated that although the present disclosure focuses on BGP routers, any network appliance such as a switch, a router, etc., on which the BGP protocol is implemented, may comprise an embodiment of the of the present disclosure, as described herein. Network paths which are in use between the ASes of the plurality of ASes 105, 110, 115, 120, 125, 130, 140 are also indicated in FIG. 1. The term "router" as used herein, in all of its various grammatical forms, refers to a device that forwards data packets along networks. A router is connected to at least two networks, commonly two local area networks (LANs) or wide area networks (WANs) or a LAN and its internet service provider's network. Routers are located at gateways, the places where two or more networks connect.

BGP routers exchange and propagate route information amongst themselves. BGP routing is described in detail in RFC 4271, available on the Internet at www.rfc-base.org/txt/rfc-4271.txt. Each BGP router has a plurality of route entries used in matching to determine a preferred route for traffic destined for an IP address. In each BGP router, traffic destined for an IP address is matched to the route entry with the most specific IP address prefix (longest match) that covers the destination IP address and forwarded to the first AS of the route entry's AS path as the next AS hop.

One particular threat that this routing infrastructure faces is so called "prefix hijacking" attacks. It is possible for a BGP router which has been hijacked (i.e. a "rogue BGP router") or BGP router that is not functioning properly to announce a false AS level route towards a prefix. If a BGP router is polluted by this announcement and replaces the legitimate route entry for this prefix with the false route in its routing table, any future Internet Protocol (IP) data traffic destined for any IP address within a victim prefix will be forwarded along this false route, causing such traffic being unrightfully intercepted, manipulated, or dropped—a result often referred to as IP traffic being "hijacked." The term "routing table", as used herein, is understood to refer to a set of rules, often viewed in table format, that is used to determine where data packets traveling over an IP network will be directed. Routing tables are typically found in routers or other IP-enabled networking devices.

Figure 2A:
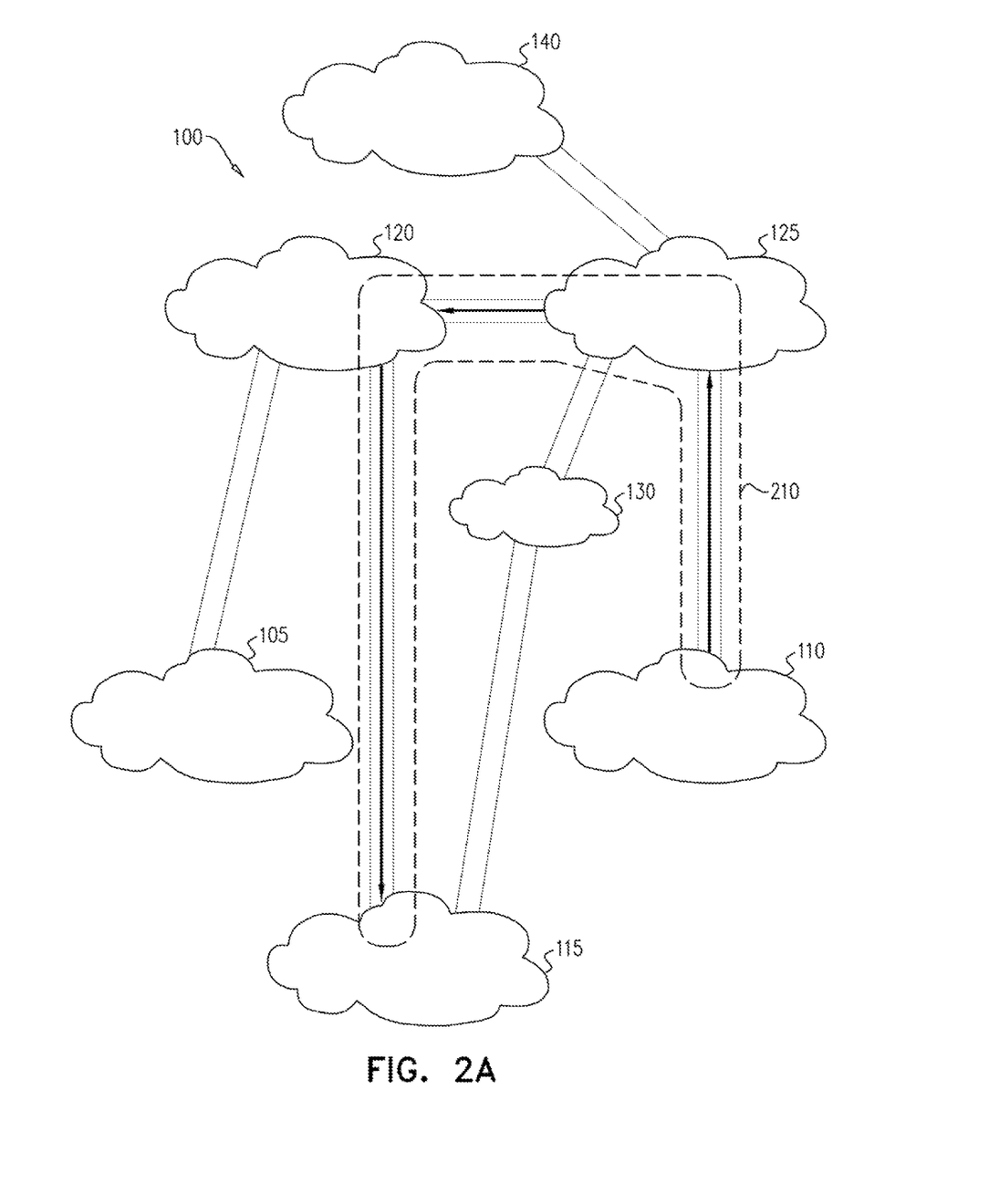
FIG. 2A is a simplified pictorial illustration of the exemplary communication network of FIG. 1, depicting a routing path between a first AS and a second AS via intermediate ASes.

As noted above, ASes, such as the plurality of ASes 105, 110, 115, 120, 125, 130, 140 communicate using the BGP. BGP Routers in the various ASes 105, 110, 115, 120, 125, 130, 140 maintain respective tables of IP networks or prefixes, which designate network reachability among the various ASes 105, 110, 115, 120, 125, 130, 140. Reference is now briefly made to FIG. 2A, which depicts an exemplary routing path 210 between a first AS 110 and a second (i.e. target) AS 115 via intermediate AS 125 and intermediate AS 120.

Figure 2B:
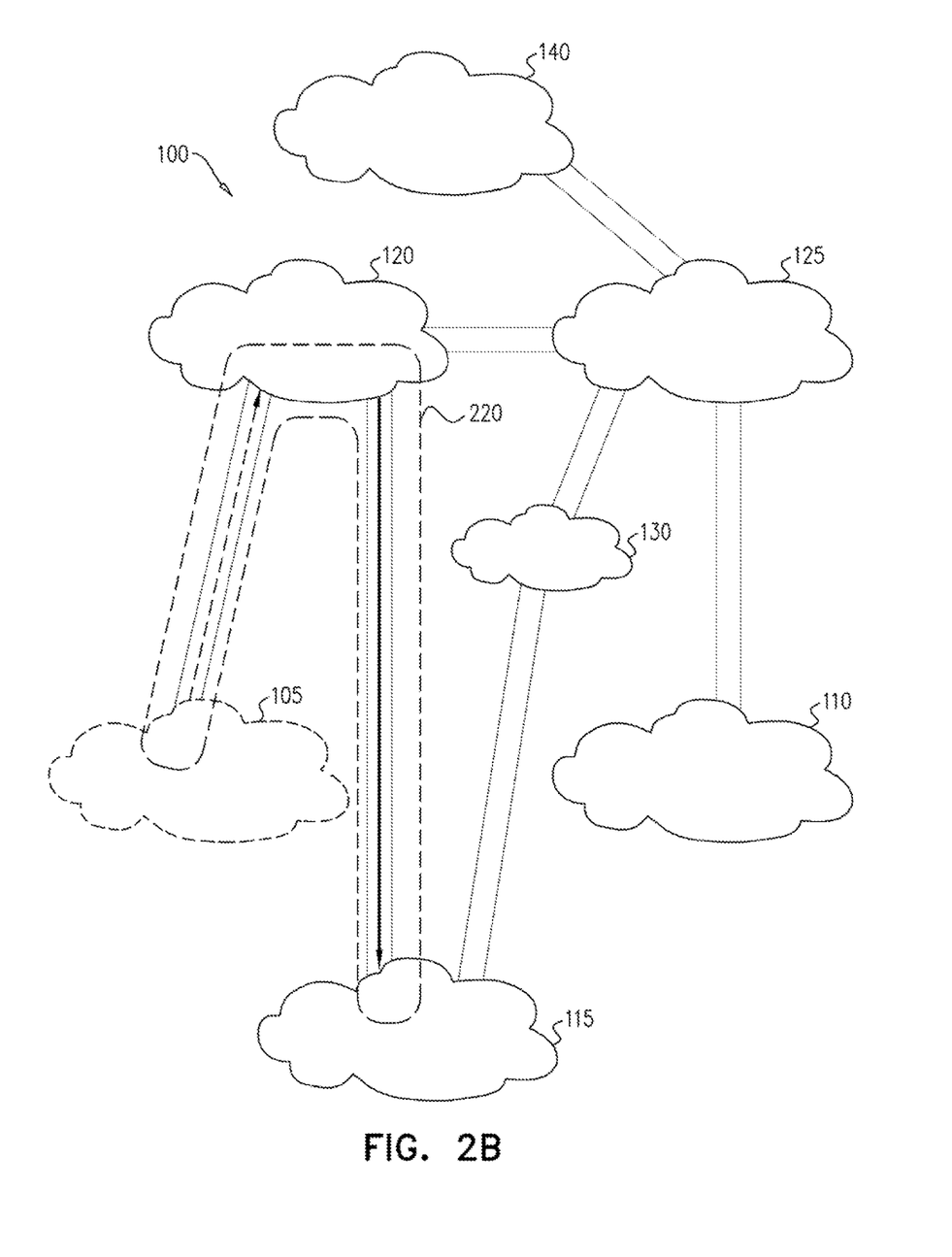

Reference is now made to FIG. 2B which is a simplified pictorial illustration of the exemplary communication network of FIG. 1, depicting a hijacked routing path 220 between a hijacking AS 105 (now depicted with dotted lines, indicative of its status as a hijacking A1S), and the a second (i.e. target) AS 115. The term "hijacking AS 105" is understood to mean that a hijacker located in AS 105 has committed an act of IP address prefix hacking. Accordingly, and by contrast to the first exemplary routing path 210 depicted in FIG. 2A, if the hijacker located in AS 105 has committed an act of IP address prefix hacking, then routing path 220, between the hijacking AS 105, and the second (i.e. target) AS 115 is now the "hijacked routing path 220". It is noted that intermediate AS 120 is in both the first exemplary routing path 210 of FIG. 2A and the hijacked routing path 220.

Figure 3:
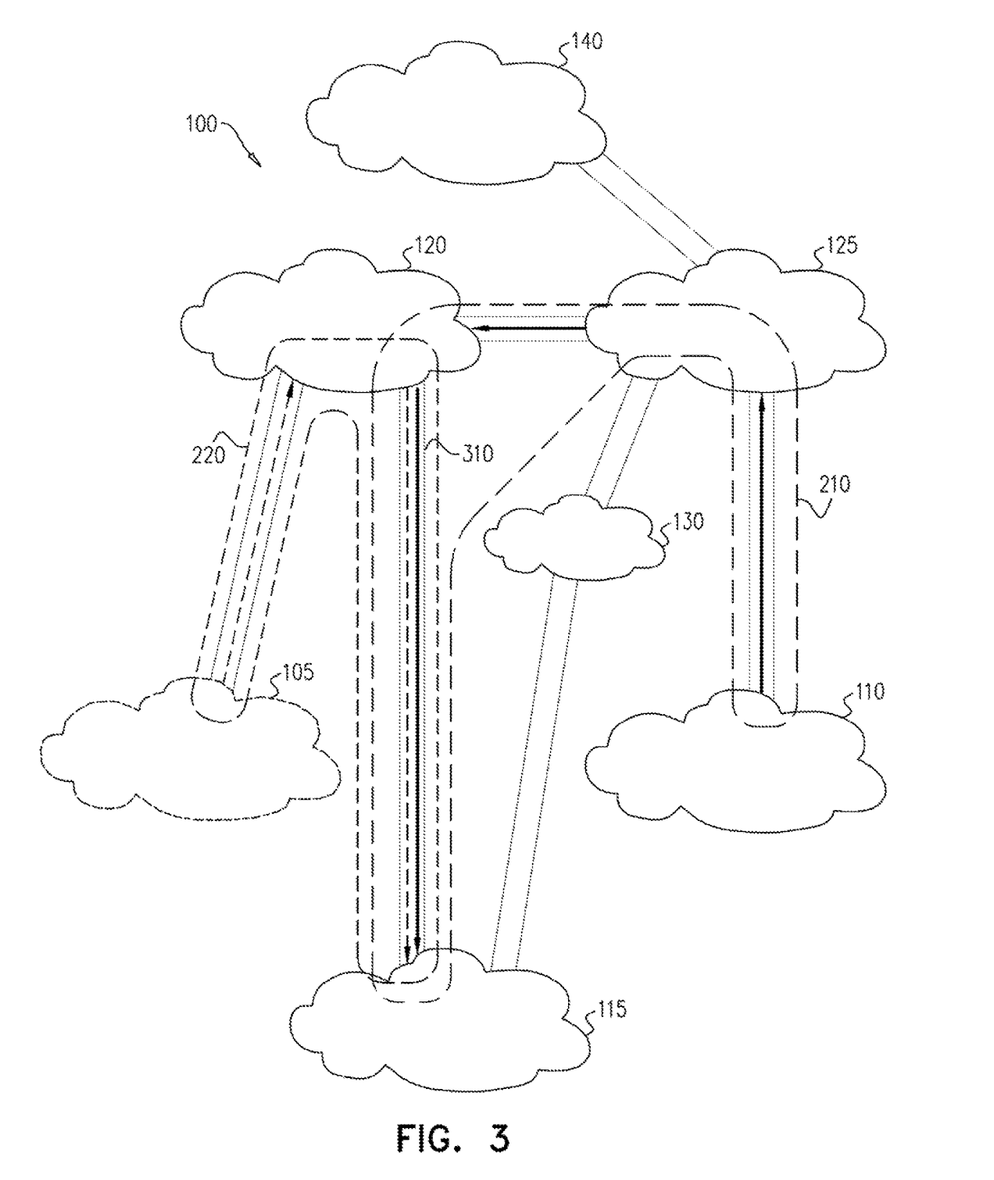
FIG. 3 is a simplified pictorial illustration of the exemplary communication network of FIG. 1, depicting the routing path between the first AS and the second AS via intermediate ASes, where one of the ASes comprises a hijacker.

Reference is now made to FIG. 3, which depicts the exemplary communication network 100 of FIG. 1, depicting a routing path 210 between the first AS 110 and the second (i.e. target) AS 115 via intermediate AS 120, and intermediate AS 125, where the routing path between two of the ASes 120 and 115 comprises a hijacked path 220. The hijacked routing path 220 between the hijacker, i.e., hijacking AS 105 and the second (i.e. target) AS 115, via AS 120, is indicated with dotted arrows. It is noted that a routing sub-path 310, comprises the hop between intermediate AS 120 and the second (i.e. target) AS 115. The sub-path 310 is a sub-path of routing path 210 which extends between the first AS 110 and the second (i.e. target) AS 115 via AS 125 and AS 120. The sub-path 310 also overlaps the path between hijacking AS 105 and the second (i.e. target) AS 115. That is to say, routing sub-path 310 has been hijacked.

In order to prevent selection of routes via the routing sub-path 310, a new routing-policy is implemented by the BGP routers. At a first stage, a hijacked route is detected. It is appreciated that the detection of the hijacked routing sub-path 310 is performed by means which are known in the art, and not described herein.

It is appreciated that an administrative network message can spread from BGP router to BGP router announcing a discovered hijacked path (i.e. hijacked routing path 220). Accordingly, when the second (i.e. target) AS 115 receives routing updates from its neighbors, the routing update might include an announcement of the hijacked path.

Upon detection of the hijacked routing sub-path 310, a new routing policy is invoked. The new routing policy finds an alternative route so that the alternative route does not have any hops in common with the hijacked route. As was noted above, hijacked routing sub-path 310 is common to the first exemplary routing path 210 and the hijacked routing path 220. An acceptable alternative path is one in which there are not any ASes in common in the routing path between AS 110 and AS 115 and the hijacked routing path 220. It is necessary to remove common ASes from the routing path, e.g. AS 120, since a packet arriving at an AS with a routing path which is common to both the first exemplary routing path 210 and the hijacked routing path 220 will proceed along the path with the longer netmask i.e. the hijacked route.

In order to find a non-hijacked path, a processor comprised in the BGP router which is associated with the second AS (i.e. target) 115 and has the hijacked routing sub-path 310 in its routing tables, searches the routing table for a route that has no AS in common with the AS path of the hijacked route 220 and has a netmask length which is the same length as the netmask of the hijacked route 220 or a shorter netmask if there is no route with the same length netmask as the netmask of the hijacked route.

Figure 4:
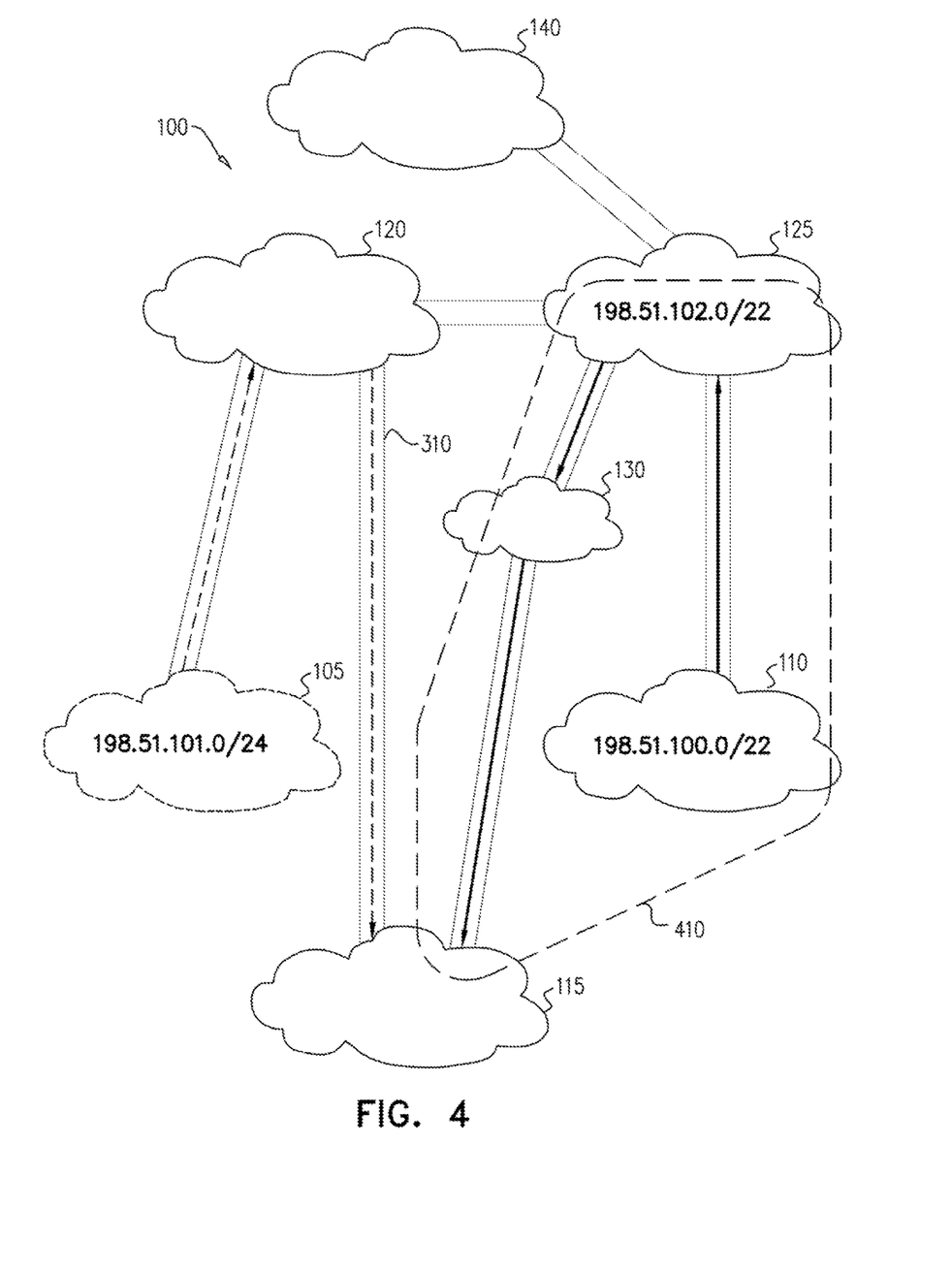
FIG. 4 is a simplified pictorial illustration of the exemplary communication network of FIG. 1, depicting a first alternative path to avoid the path hijacked by the hijacker of FIG. 3.

Reference is now made to FIG. 4, which is simplified pictorial illustration of the exemplary communication network 100 of FIG. 1, depicting a first alternative path 410 to avoid the path hijacked by the hijacking AS 105 of FIG. 3. By way of example, the first AS 110 is depicted as having a network prefix of 198.51.100.0/22. The hijacking AS 105 is depicted as having a more specific, and therefore preferred network prefix of 198.51.101.0/24. The first alternative path 410, depicted in FIG. 4, is via intermediate AS 125 which has a network prefix of 198.51.102.0/22. Since the intermediate AS 125 and first AS 110 have the same netmask length (i.e. /22), and a path from the second (i.e. target) AS 115 to first AS 110 exists via intermediate AS 125 and via AS 130, the new policy implements the path from the first AS 110 to the second (i.e. target) AS 115 via the intermediate AS 125 and fourth AS 130, thereby avoiding sub-path 310 via AS 120.

Accordingly, the BGP router of second AS (i.e. target) 115 finds a path to use to route packets to the first AS 110 using a less specific /22 netmask route in preference to a /24 netmask route. A processor of the BGP router of second AS (i.e. target) 115 extracts the /24 netmask route from the /22 netmask route, and passes the new /24 netmask route (which has been subjected to the extraction) to network forwarding hardware. Specifically, the /24 netmask route, originating at the hijacking AS 105, is the hijacker's route. The /24 netmask route passes through intermediate AS 120 the next hop of which, routing sub-path 310, comprises a hijacked path. The BGP router of the second (i.e. target) AS 115 therefore must find a route utilizing a /24 netmask that points to fourth AS 130 in order to avoid routing over intermediate AS 120. That is to say, the new route which utilizes a /24 netmask should avoid intermediate ASes which are affected by the hijacking, Just dropping the hijacked route alone from the BGP routing tables is a necessary but not sufficient precaution. In simpler terms, the overlapping, hijacked paths are removed from the routing.

Once the BGP router of first AS 110 finds a path to use to route packets to the second (i.e. target) AS 115 using the less specific /22 netmask route in preference to the /24 netmask route, as detailed above, the new route is created in the routing table. The new route will have the same prefix and netmask as the hijacked route, as well as the same BGP attributes as the first route. BGP attributes include, by at not limited to certain well-known mandatory attributes, such as AS-path, the autonomous systems that routing information passed through to get to a specified route, and used to prevent routing loops in BGP; next-hop; and so forth. Additionally, certain attributes are well-known discretionary attributes, and optional attributes. Other exemplary attributes include local preference, i.e. the preferred route for a given path; and Multi-Exit Discriminator (MED), an optional nontransitive BGP attribute, which provides a hint to external neighbors about the preferred path into an autonomous system (AS) that has multiple entry points. The MED is also known as the external metric of a route. A lower MED value is preferred over a higher value. Other BGP attributes are known to persons of skill in the art.

If, for whatever reason, a route used to create a new route is deleted from BGP routing tables, then the newly created routes in the BGP tables need to be removed. By way of example, at some point, subsequent routing updates may occur which require changing routing, which may cause the new route to be deleted from BGP routing tables. In such a case a new route may be created, i.e., alternative path 410, with a longer (i.e. less specific) netmask between first AS 110 and the second (i.e. target) AS 115. In order to implement the update, the BGP table in the BGP router of the second (i.e. target) AS 115 is updated in order to add an indication to the alternative path 410 in the BGP table that the alternative path 410 was created with a longer netmask. Entering said indication in the BGP table provides a fallback so that if the alternative path 410 in the BGP table is deleted, the BGP router is able to revert back to the original poisoned route, routing sub-path 310 and to then find a new alternative routing path. An indication that the alternative path 410 is the /24 route derived from the /22 route is stored, so that if and when the original route (i.e. the /22 route) is deleted, the new /24 route (i.e. the alternative path 410) will also be deleted. The BGP router performs the steps described above to find the new alternative routing path at the time of deletion.

Additionally, the poisoned route is put into a new, separate routing table, stored as a poisoned route table, so that if a better alternative route becomes available (i.e. a route with a longer netmask), the BGP router of first AS 110 may switch to the better alternative route and while still avoiding the poisoned route. It is appreciated that switching to the better alternative is not urgent, so that the BGP router may episodically walk the poisoned route table and determine if the better alternative route is presently available. It is also appreciated that if for some reason the poisoned route is no longer poisoned (for instance the rouge BGP router which was been hijacked is no longer hijacked), it may be desirable to restore the original route which is now no longer poisoned.

Figure 5:
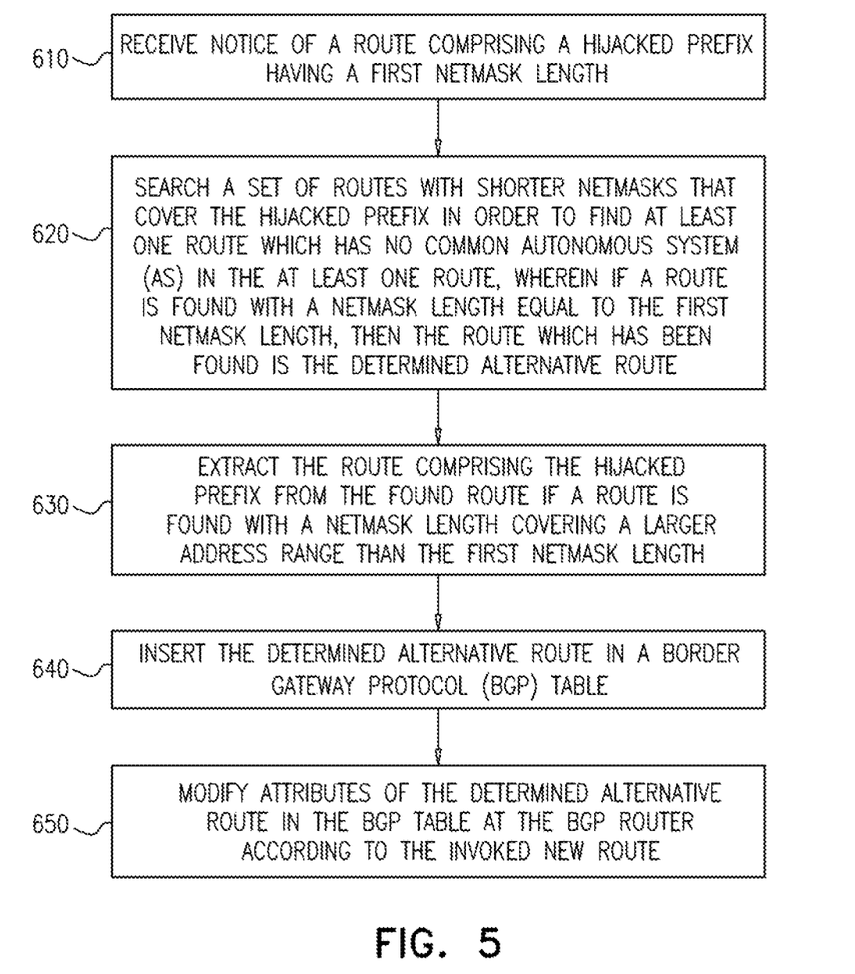
FIG. 5 is a simplified flowchart diagram depicting an exemplary method for one embodiment of the poison-path routing policy in the exemplary communication network of FIG. 1.

Reference is now made to FIG. 5, which is a simplified flowchart diagram depicting a method for one embodiment of the poison-path routing policy in the exemplary communication network of FIG. 1. The method describes a method for invoking a new route at a BGP router in order to avoid a hijacked route. At step 610, notice is received at the BGP router of a route comprising a hijacked prefix having a first netmask length. The term "notice" as used in the present disclosure and claims, in all of its various grammatical forms, refers to messages sent over a network by networking devices indicating network information and other associated information, such as, but not limited to, routing updates. Such notices and messages are often sent at regular intervals, or after a change in network topology.

By way of example, and with reference to FIG. 3, the BGP router of first AS 110 receives notice that the route to the second (i.e. target) AS 115 comprises a hijacked hop, sub-path 310. As was noted above in the discussion of FIG. 3, the notice may be received as part of a routing update received from neighboring BGP routers.

In step 620, a set of routes with shorter netmasks that cover the hijacked prefix are searched in order to find at least one route which has no common autonomous system (AS) in the hijacked route. If a route, such as alternative path 410 (FIG. 4) is found with a netmask length equal to or shorter than the first netmask length of the hijacked prefix, then the route which has been found is the determined alternative route. In step 630, the route comprising the hijacked prefix is removed from the routing tables of the BGP router if a route is found with a netmask length covering a larger address range than the first netmask length.

In step 640 the determined alternative route is inserted in a Border Gateway Protocol (BGP) table at the BGP router. Finally, at step 650 attributes of the determined alternative route in the BGP table at the BGP router are modified according to the invoked new route.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:
1. A method comprising:
 receiving a notice at a router of a particular route comprising a hijacked prefix having a hijacked prefix netmask length;
 searching a set of routes with equal or shorter netmask lengths that cover the hijacked prefix in order to find at least one route which has no autonomous system (AS) in common with the particular route comprising the hijacked prefix, wherein if a specific route is found with a netmask length equal to or shorter than the hijacked prefix netmask length, then the specific route which has been found is a determined alternative route;
 extracting the particular route comprising the hijacked prefix from the specific route if said specific route has a netmask length covering a larger address range than the hijacked prefix netmask length;
 inserting the determined alternative route in a routing table at the router; and
 modifying attributes of the determined alternative route in the routing table according to the determined alternative route.

2. The method according to claim 1 and wherein if a first route is found with a netmask length equal to the hijacked prefix netmask length, the first route is preferable to a second route with a netmask length shorter than the hijacked prefix netmask length.

3. The method according to claim 1 and further comprising, if the specific route is found having its netmask length covering a larger address range than the hijacked prefix netmask length, inserting the determined alternative route in the routing table with an indication that the determined alternative route was created with its netmask length covering a larger address range than the hijacked prefix netmask length.

4. The method according to claim 1 and further comprising putting a poison path comprising the hijacked prefix in a separate routing table.

5. The method according to claim 4 wherein if an alternative route with a longer netmask becomes available, the alternative route with a longer netmask is set to the determined alternative route.

6. The method according to claim 4 and further comprising the router episodically walking the separate routing table in order to determine if a route with a longer netmask has become available.

7. The method according to claim 4 and further comprising the router episodically walking the separate routing table in order to determine if the particular route is no longer hijacked, and if so, replacing the determined alternative route with the particular route.

8. The method according to claim 1 wherein the router comprises a Border Gateway Protocol (BGP) router.

9. The method according to claim 1 wherein the routing table comprises a Border Gateway Protocol (BGP) routing table.

10. A system comprising:
a router operative to receive a notice of a particular route comprising a hijacked prefix having a hijacked prefix netmask length;
a processor in the router operative to search a set of routes with shorter netmasks that cover the hijacked prefix in order to find at least one route which has no autonomous system (AS) in common with the particular route comprising the hijacked prefix, wherein if a specific route is found with a netmask length equal to or shorter than the hijacked prefix netmask length, then the specific route which has been found is a determined alternative route;
the processor of the router being further operative to:
extract the particular route comprising the hijacked prefix from the specific route if said specific route has a netmask length covering a larger address range than the hijacked prefix netmask length;
insert the determined alternative route in a routing table at the router; and modify attributes of the determined alternative route in the routing table according to the determined alternative route.

11. The system according to claim 10 and wherein if the processor finds a first route with a netmask length equal to the hijacked prefix netmask length, and a second route with a netmask length shorter than the hijacked prefix netmask length, the first route is preferable to the second route.

12. The system according to claim 10 wherein the processor inserts the determined alternative route in the routing table with an indication that the determined alternative route was created with a netmask length covering a larger address range than the hijacked prefix netmask length if the specific route is found having its netmask length covering a larger address range than the hijacked prefix netmask length.

13. The system according to claim 10 and further comprising the processor being operative to put a poison path comprising the hijacked prefix in a separate routing table.

14. The system according to claim 13 wherein the processor sets a route with a longer netmask to the determined alternative route if an alternative route with a longer netmask becomes available.

15. The system according to claim 13 and further comprising the processor being operative to episodically walk the separate routing table in order to determine if the particular route is no longer hijacked, and if so, to replace the determined alternative route with the particular route.

16. The system according to claim 13 and further comprising the router being operative to episodically walk the separate routing table in order to determine if a route with a longer netmask has become available.

17. The system according to claim 10 wherein the router comprises a Border Gateway Protocol (BGP) router.

18. The system according to claim 10 wherein the routing table comprises a Border Gateway Protocol (BGP) routing table.

19. A non-transitory computer-readable medium including contents that are configured to cause a computing system to perform a method comprising:
receiving a notice at a router of a particular route comprising a hijacked prefix having a hijacked prefix netmask length;
searching a set of routes with equal or shorter netmask lengths that cover the hijacked prefix in order to find at least one route which has no autonomous system (AS) in common with the particular route comprising the hijacked prefix, wherein if a specific route is found with a netmask length equal to or shorter than the hijacked prefix netmask length, then the specific route which has been found is a determined alternative route;
extracting the particular route comprising the hijacked prefix from the specific route if said specific route has a netmask length covering a larger address range than the hijacked prefix netmask length;
inserting the determined alternative route in a routing table at the router; and
modifying attributes of the determined alternative route in the routing table according to the determined alternative route.

20. The computer-readable medium according to claim 19 wherein, at least one of:
the router comprises a Border Gateway Protocol (BGP) router; or
the routing table comprises a Border Gateway Protocol (BGP) routing table.

\* \* \* \* \*